G. W. BOWLSBY.
Horse-Hay Fork.
No. 80,442.
Patented July 28, 1868.
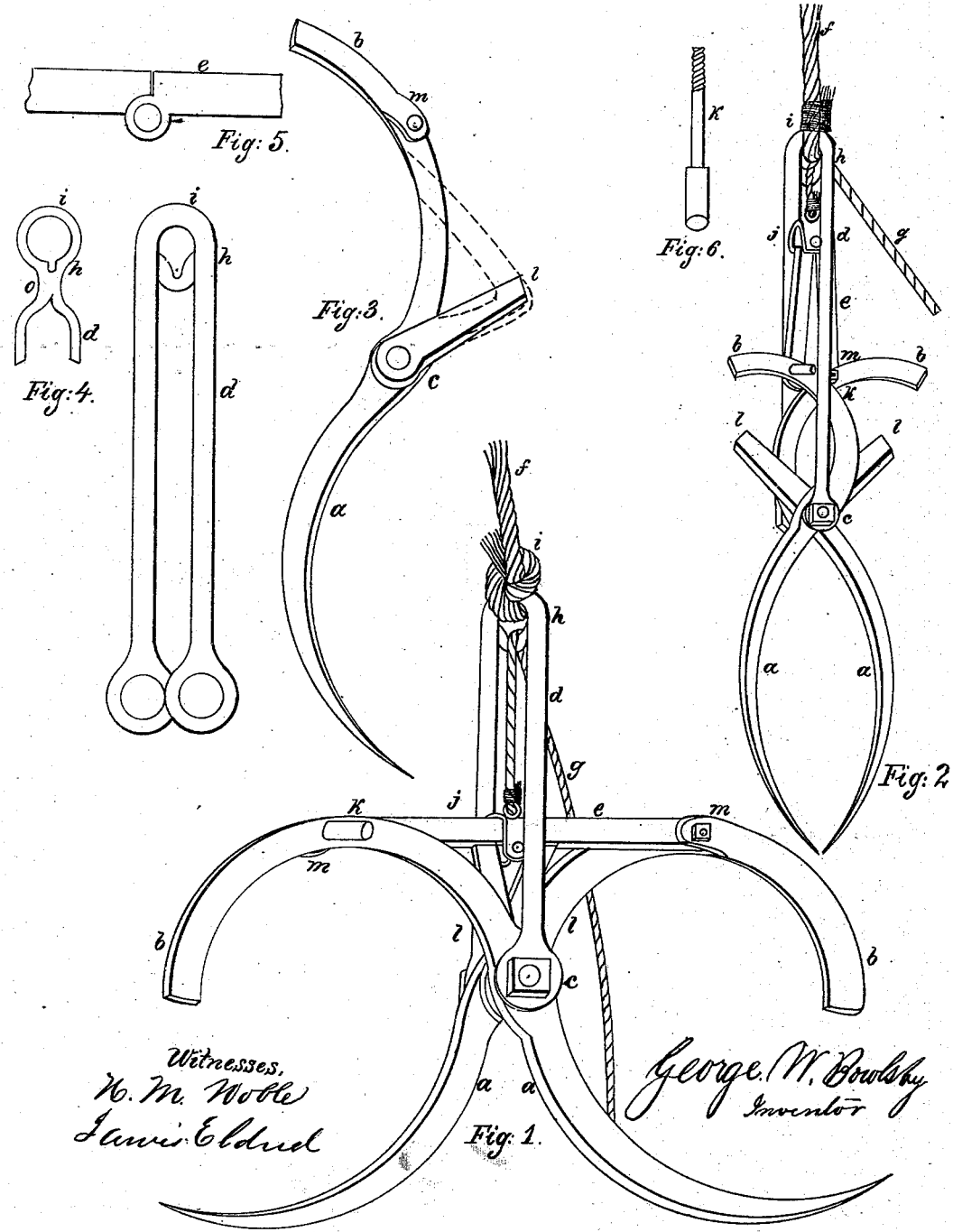

United States Patent Office.

GEORGE W. BOWLSBY, OF MONROE, MICHIGAN.

Letters Patent No. 80,442, dated July 28, 1868.

IMPROVEMENT IN HORSE HAY-FORKS.

The Schedule referred to in these Letters Patent and making part of the same.

TO ALL WHOM IT MAY CONCERN:

Be it known that I, GEORGE W. BOWLSBY, of the city and county of Monroe, and State of Michigan, have invented a new and improved Horse Hay-Fork; and I do hereby declare that the following is a full and exact description thereof, reference being had to the accompanying drawings, and to the letters of reference marked thereon.

The nature of my invention consists in the combination of two metal tines, whose upper ends are formed into handles, said handled tines crossing each other at or near the middle, and pointing outwardly, and jointed or bolted together at said junction, and made practically operative by certain devices and auxiliaries of hinges, bolts, staples, bails, guards, toggles, rope-supports, and passages, stops, &c., &c.

To enable others skilled in the art to make and use my invention, I will proceed to describe its construction and operation.

In the annexed drawings—

Figure 1 is a perspective view of the fork when entered in the hay, and loaded ready for lifting.

Figure 2, a perspective view of the same, when emptied and in position for entering the hay.

Figure 3, a perspective view of a single tine, from the inner side, or side facing its fellow-tine.

Figure 4, the bail or bridle, to which the fork is suspended.

Figure 5, the toggle-lever, plane-side view, without the clevis or lifting-stirrup.

Figure 6, one of the long-headed bolts in the ends of the toggle.

Similar letters of reference are for like parts.

In fig. 1, $a$ $a$ are the tines for entering and lifting the hay; $b$ $b$, the handles for forcing it down; $c$, the pivot-bolt, on which the tines swing to their proper places; $d$, the suspending bail; $e$, the toggle-lever; $f$, the lifting-rope; $g$, the tilting-cord or lanyard; $h$, the reverse-movement support, for the tilting-lanyard; $i$, the tie-passage, for the lifting-rope; $j$, the tilting-clevis or stirrup; $k$, the long bolt-heads, at the ends of the toggle, acting as guards against the fall of the bridle upon the hands; $l$ $l$, the toggle-posts supporting the toggle $e$; $m$ $m$, the guards, covering the ends of the toggle $e$, and supporting one end of the bolts.

In fig. 2, the fork is shown as just emptied by pulling at the lanyard $g$, and also as it returns to the wagon to be reloaded.

Fig. 3 shows the construction of the tines. The post $l$ is a small bar of iron, welded on to the tine on the inner surface of the enlargement, shown at $e$, so as to meet the toggle near the joint, and support it against downward strain, to insure the uniform position and stay of the toggle $e$ at the proper level, and also to indicate by the sound, without the necessity of examination, when it is set. It also stiffens the joint $c$ at the weak point of the fork, and separates, with its fellow, the tines to a proper distance to operate the toggle $e$ and prevent the clogging of the hay between the tines. It may be prolonged and turned back in a curved or angular form, and lapped on to the tines, as seen at the dotted lines, fig. 3. The guards $m$ $m$ are for the purpose of holding the bolts, for keeping the hands off the ends of the toggle, and to strengthen the handles at their weak point. The handles $b$ $b$ press down on to the hay and hold it from rising off the tines, thus assisting its stay.

In fig. 4, the support $h$ is welded to the bail, and guttered on the upper side to bring the lanyard always below the tie-rope $f$, out of the way of friction with it, and also to keep the toggle $e$ in the centre of the bail when lifting it. The upper part of the bail may also be made as seen at $o$, fig. 4.

Fig. 5 is the toggle or toggle-lever $e$, and may be formed of the common carriage-joint "stubs," or may be varied at pleasure in form, if so that it always falls a trifle below the centre to insure stay, but not far enough to make too great a pull necessary to lift it when loaded.

Fig. 6 is a common bolt, with elongated head, $k$, to act as a guard against the fall of the bail $d$ upon the hands, and to keep it in a nearly erect position when not strained erect by the tie-rope. It should be rounded, so as not to be hurtful to the hands.

This fork may be made of wrought iron or steel, or partly of each, or of malleable cast iron, or of common cast iron, or even of wood. I prefer the malleable cast iron to all other material, because of cheapness, superior durability, stiffness, and easy replacing of broken or lost parts, and also uniformity of construction after the best pattern found by working experiment.

The operation of the fork is as follows:

Taking it by the handles $b\ b$, in the position fig. 2, it is thrust directly downward, depending upon the curve in the tines to turn it outwards into proper position, as in fig. 1, till the sound of the fall of the toggle-lever upon the posts $l\ l$ tells that it is set. No more is necessary till it reaches its destination, when a gentle pull at the lanyard $g$ empties it, and then it is returned to the hands of the operator by the same lanyard, already in position to use again.

The advantages of my fork are, simplicity of construction and operation; extreme lightness in handling; extreme cheapness; easy entering of the hay, and also of emptying; facility of separation for repairs; equality of strength, by distribution of the load-strain over all the parts; adaptation to all kinds of hay, long and short, and to straw, grain, &c., by reason of its broad under support and strong packing quality from above; the absence of top hamper, a necessity in passing through narrow places, as outside doors, low beams, rafters, &c., &c.; the certainty of operation; the great tenacity of its hold in the hay; the self-setting qualities both in filling and emptying, as it is always ready at both ends of the route; its non-liability to do harm to the person, either in use or lying about; its small size and compactness for storage, either when mounted or in parts.

I claim—

1. The projecting posts $l$, secured at an angle to the tines $a\ a$ at their pivot $c$, in combination therewith, and with the toggle-lever $e$, substantially as and for the purpose described.

2. The combination and arrangement of the swinging tines $a$, enlarged as described at $c$, bail $d$, toggle $e$, clevis $j$, extended bolts $k$, guards $m$, supporting-bar $h$, and projecting posts $l$, substantially as described for the purpose specified.

GEORGE W. BOWLSBY.

Witnesses:
H. M. NOBLE,
JARVIS ELDRED.